(12) United States Patent
Kay

(10) Patent No.: US 7,982,343 B2
(45) Date of Patent: Jul. 19, 2011

(54) MAGNETOHYDRODYNAMIC ENGERGY CONVERSION DEVICE USING SOLAR RADIATION AS AN ENERGY SOURCE

(76) Inventor: Thomas P. Kay, Woodstock, NY (US)

( * ) Notice: Subject to any disclaimer, the term of this patent is extended or adjusted under 35 U.S.C. 154(b) by 202 days.

(21) Appl. No.: 12/209,613

(22) Filed: Sep. 12, 2008

(65) Prior Publication Data

US 2009/0072632 A1    Mar. 19, 2009

Related U.S. Application Data

(60) Provisional application No. 60/993,557, filed on Sep. 14, 2007.

(51) Int. Cl.
   *H02K 44/08* (2006.01)
   *H02K 44/12* (2006.01)
   *B60K 16/00* (2006.01)
   *F03G 6/06* (2006.01)
(52) U.S. Cl. ....... 310/11; 60/641.8; 60/641.15; 126/635
(58) Field of Classification Search .......... 310/11
   See application file for complete search history.

(56) References Cited

U.S. PATENT DOCUMENTS

| 4,067,315 A * | 1/1978 | Fehlner et al. | 126/636 |
|---|---|---|---|
| 4,135,367 A * | 1/1979 | Frosch et al. | 60/641.15 |
| 4,191,901 A * | 3/1980 | Branover | 310/11 |
| 4,275,318 A * | 6/1981 | Duncan | 310/11 |
| 4,350,915 A * | 9/1982 | Wyatt et al. | 310/306 |
| 4,381,462 A * | 4/1983 | Radebold | 310/11 |
| 4,388,542 A * | 6/1983 | Lovelace et al. | 310/11 |
| 4,398,391 A * | 8/1983 | English, Jr. | 60/641.15 |
| 4,450,361 A * | 5/1984 | Holt | 290/1 R |
| 5,404,723 A * | 4/1995 | Parker et al. | 60/641.15 |
| 6,487,859 B2 * | 12/2002 | Mehos et al. | 60/641.8 |
| 6,668,555 B1 * | 12/2003 | Moriarty | 60/641.8 |

FOREIGN PATENT DOCUMENTS

EP        18822 A2 *  11/1980

OTHER PUBLICATIONS http://en.wikipedia.org/wiki/Roots_blower Oct. 2010.*

* cited by examiner

*Primary Examiner* — Burton Mullins
(74) *Attorney, Agent, or Firm* — Levine & Madelbaum

(57) ABSTRACT

A magnetohydrodynamic energy conversion device has a tungsten housing containing a working fluid and a conduit leading from and reentering the housing under pressure developed by heating the fluid with by an optical concentrator which directs rays from the sun at the housing. A voltage is developed across electrodes spaced within the conduit as the heated fluid passes therethrough. The fluid may be directed to turn a gas turbine for driving an electric generator.

6 Claims, 1 Drawing Sheet

MAGNETOHYDRODYNAMIC ENGERGY CONVERSION DEVICE USING SOLAR RADIATION AS AN ENERGY SOURCE

BACKGROUND OF THE INVENTION

This invention relates to magnetohydrodynamic (MHD) energy conversion devices, and especially to such a device for converting solar energy to electrical energy. An example of such a device is illustrated and described in U.S. Pat. No. 4,275,318 issued to Fred A. Duncan.

Existing MHD devices have not been commercially successful primarily because the working fluid did not have a sufficient degree of ionization to achieve a specific electrical conductivity of 100 mho/m or more. Operating the working fluid at a higher temperature could alleviate this problem. Temperatures of the required magnitude cannot be achieved by combustion of the usual fuels.

SUMMARY OF THE INVENTION

However, this is possible using solar radiation as an energy source. The surface temperature of the sun is about 6000° K. Theoretically this is the highest temperature achievable at the focal point of a concentrating mirror. On the ground this is not possible since a part of the solar spectrum is absorbed by the earth's atmosphere. However, that is not true in space or on the moon. Yet, to use such extremely high temperatures is impractical and also not necessary. Presently it is believed that temperatures between 2500° K. and 3000° K. would be sufficient to operate a MHD device.

For photo-ionization to occur, the energy of the ionizing radiation has to be equal to or greater than the ionization energy of the atom to be ionized. In the case of cesium, this would be about 3 eV. Optical radiation of this energy has a wavelength of 200 nm (2000 Angstrom) or shorter. Radiation having wavelengths shorter than 200 nm is absorbed by the earth's atmosphere. Therefore, in space or on the moon, this energy could be used to augment the ionization of a MHD device. The absorption of a photon by an atom and subsequent ejection of an electron is almost instantaneous (on the order of $10^{-8}$ seconds). This means the photo-ionization could be created right between the electrodes in the duct. The working fluid is practically standing still during such a time span. Fortunately, for the inverse reaction (recombination) to occur, a 3-body collision is needed. This could be a collision between a helium atom, a cesium ion, and an electron. (The wall of the duct can also act as the third particle). Consequently, the number of recombination events can be adjusted by the gas pressure.

Recombination of ions, that were created by thermal ionization, upstream of the expansion nozzle, will occur too. In the tungsten housing a steady state value of the number of charged particles will be established. This value forms when the number of ionization events and recombination events is equal. Yet down stream of the expansion nozzle the number of recombination events is larger than the ionization events. The working fluid flows slowly and during the time required to reach the electrodes, electrical conductivity is reduced. Obviously it is better to create the conductivity between the electrodes rather than upstream of it.

DESCRIPTION OF THE PREFERRED EMBODIMENT

Figure 1:
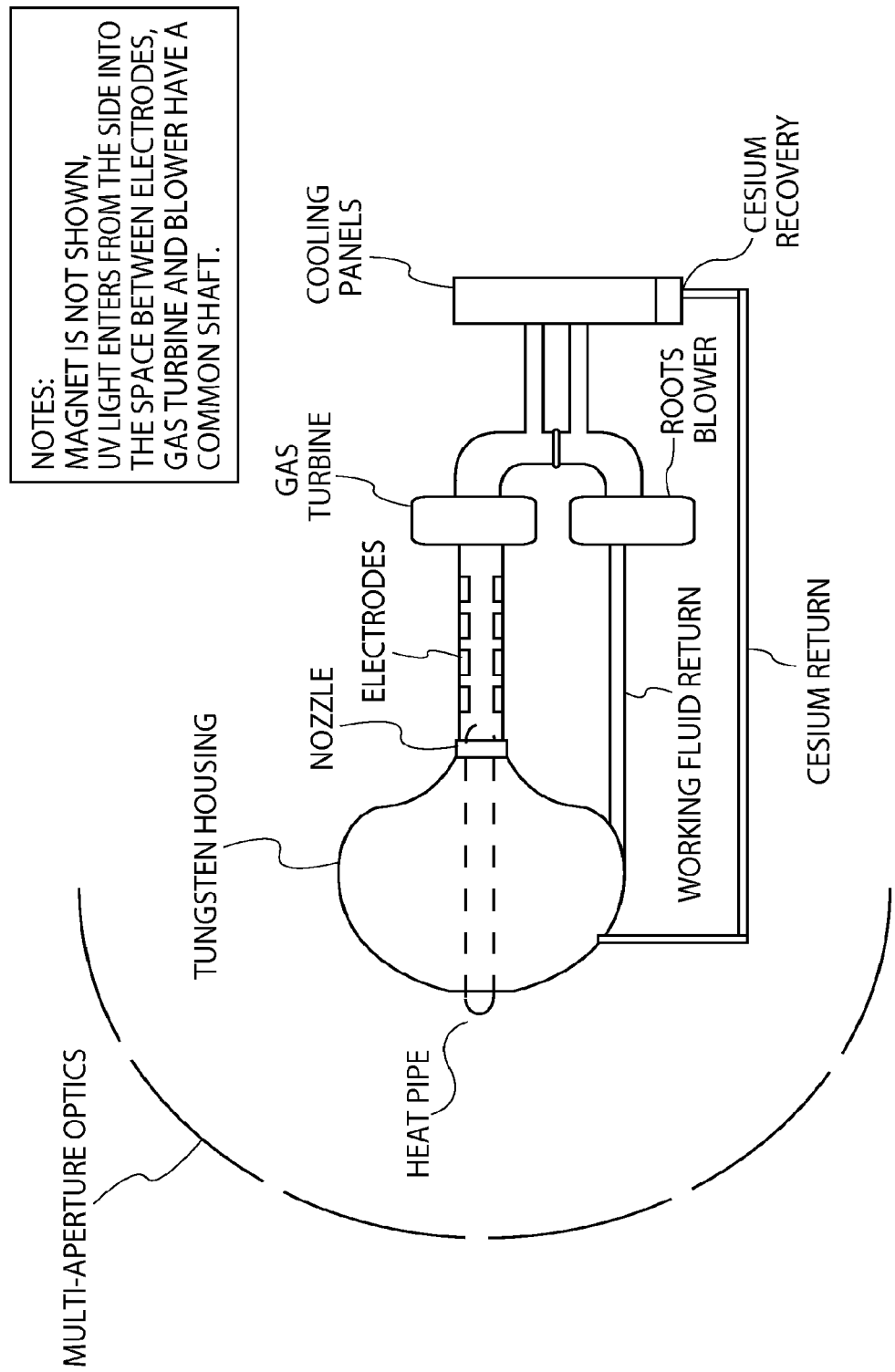
FIG. 1 is a schematic representation of an apparatus according to this invention.

Referring to FIG. 1, the solar radiation is concentrated by multi-aperture optics on to a tungsten housing. Other means for concentrating solar heat on the housing can be employed. For example, a parabolic solar reflector (not shown), such as the Clear Dome Sola Reflex, made by Clear Dome Solar Thermal LLC, of San Diego, Calif. could be used. Such a reflector is capable of condensing sunlight to a temperature of 2,500° F. or higher. Such a reflector could be controlled to track the sum so as to receive maximum solar radiation throughout the day.

Another approach to transmitting solar heat to a working fluid inside the housing, which in this case need not necessarily be made of tungsten, is to use a heat pipe, or two or more heat pipes, such as that made by Thermal Transtech International Corporation, of Taipei, Taiwan. A heat pipe is a sealed hollow tube containing a wicking material and an evaporable liquid. For the purposes of this invention the tube is preferably of a heat resistant material, such as a ceramic or carbon fibers, and the liquid within could be a high boiling point metal such as silver or lithium. Thermal energy is very efficiently transmitted from one end of the heat pipe to the other. Therefore, a heat pipe could be arranged to pass through the wall of the housing containing the working fluid. One end of the heat pipe can be arranged to be heated by a parabolic reflector, such as by being located at the focus of the reflector, and the other end in contact with the working fluid within the housing. In this way, the solar energy is used to efficiently heat the working fluid. An advantage of using a heat pipe in this way is that a heat pipe transfers heat in only one direction, i.e., from the reflector to the working fluid container. Multiple parabolic reflectors, each including a heat pipe or pipes could be used to heat the working fluid in the housing. Some heat pipes are flexible, which may aid this arrangement, as well as in combination with sun-tracking reflectors.

Inside the tungsten housing is the high-pressure part of the working fluid. Initially helium seeded with 2% cesium is considered as the working fluid. Inside the tungsten housing the working fluid will reach the static design pressure and temperature. The static pressure will force the working fluid through a nozzle, which converts some of the pressure to kinetic energy (pressure is potential energy density).

In the MHD duct some, but not all, of the kinetic energy is converted into electrical energy. Any remaining kinetic energy of the gas stream is converted in the gas turbine into mechanical (kinetic) energy. The Roots blower returns the working fluid to the tungsten housing. The gas turbine and the Roots blower have a common shaft. Alternatively, the Roots blower, or any other type of pump used in place of the Roots blower, can be driven independently of the turbine, such as electrically.

The rotation of the gas turbine by the working fluid can be used to drive an electrical generator (not shown). The gas turbine could be a Bryton cycle engine including a compressor, a combustor, and a turbine, the compressor and turbine being on the same shaft. The electrical energy created by the generator is available to supplement the electrical energy generated by the flow of working fluid through the MHD duct. Alternatively, the magnetic field and electrodes in the MHD duct could be eliminated, and the working fluid used to drive the turbine which in turn drives the electrical generator so as to create electrical energy.

In series, following the gas turbine, could be a Bryton cycle engine followed by a Stirling cycle engine. The hot working fluid exiting the gas turbine can be used to heat the air in the combustor of the Bryton cycle engine. The Stirling cycle engine is a closed-cycle external combustion engine, having a working gas permanently enclosed within a cylinder. The engine is powered by an external heat source, e.g., the hot working fluid. Each engine can be part of an engine-generator set to produce additional electrical energy for supplementing the electricity generated by the MHD duct. If desired, the Stirling cycle engine could be used in place of the turbine, rather than in series with it. In fact, other types of units for creating electrical energy could be used individually or in combination with the MHD working fluid.

Before the working fluid is allowed to enter the Roots blower it is detoured to cooling panels and a cesium recovery system. The heat still remaining in the working fluid after passing through the gas turbine is waste heat and needs to be cooled away. However the waste heat can be used further for, e.g., room heating. The cesium is returned as a liquid to the tungsten housing.

A heat pipe, as described above, heated by a parabolic solar reflector, could transmit heat directly into an MHD duct, i.e., the heat pipe could be located within the duct. The inner walls of the duct may be shaped, e.g., honeycomb or accordion, to cause turbulence in the moving working fluid, thereby increasing its speed of movement. The speed of movement may be augmented by varying the dimensions of the accordian folds and/or the honeycombs cells. Increased speed will result in an increase in the electrical output of the MHD device. Speed of movement of the working fluid can also be increased by shaping the outer walls of the MHD duct to produce convection currents, which further increase working fluid temperature. The increased temperature contributes to spinning of the plasma which might cause it to reach supersonic speeds.

The heat pipe used inside the MHD duct may be made of a ceramic or other non-magnetic, high-temperature-resistant material. The unit comprising a heat pipe within the MHD duct may be thought of as a closed unit solid state MHD cell.

It is possible that the MHD cell could be heated by energy sources other than the sun, such as geothermal, natural gas, nuclear, chemical reaction, or any other suitable source of energy capable of providing sufficient heat to the heat pipe.

Not shown in FIG. 1 is the magnet. Its field lines are perpendicular to the paper plane. Also not shown is the light beam entering, also perpendicular to the paper plane, into the inter-electrode space of the duct. Windows for this purpose may be provided in the duct.

Among other advantages of the present invention are:

1. The ability to achieve higher working fluid temperatures than obtainable by combustion of common fuels (coal, oil, natural gas), and 2. The use of heat pipe(s) to heat MHD working fluid, or any other type of working fluid to drive a turbine or any other type of engine.

It is to be appreciated that the foregoing is a description of a preferred embodiment of the invention to which modifications and variations may be made without departing from the spirit and scope of the invention.

What is claimed is:

1. A magnetohydrodynamic energy conversion device comprising,
   a housing,
   a working fluid disposed within said housing,
   a conduit leading from and reentering said housing,
   a plurality of electrodes spaced within said conduit,
   an optical concentrator for concentrating rays from the sun and directing them at said housing for heating the working fluid therein, and
   a heat pipe having one end proximate said optical concentrator for being heated by said concentrating rays from the sun and an opposite end distal from said optical concentrator in contact with the working fluid for heating the working fluid, wherein said one end of said heat pipe is arranged to pass through a wall of the housing containing the working fluid,
   whereby a voltage is induced across said electrodes.

2. A magnetohydrodynamic energy conversion device comprising,
   a housing,
   a working fluid disposed within said housing,
   a conduit leading from and reentering said housing,
   a plurality of electrodes spaced within said conduit,
   an optical concentrator for concentrating rays from the sun and directing them at said housing for heating the working fluid therein, and
   a heat pipe having one end proximate said optical concentrator for being heated by said concentrating rays from the sun and an opposite end distal from said optical concentrator in contact with the working fluid for heating the working fluid, wherein said opposite end of said heat pipe is disposed inside said conduit,
   whereby a voltage is induced across said electrodes.

3. A magnetohydrodynamic energy conversion device comprising,
   a housing,
   a working fluid disposed within said housing,
   a conduit leading from and reentering said housing,
   a plurality of electrodes spaced within said conduit, and an optical concentrator for concentrating rays from the sun and directing them at said housing for heating the working fluid therein, and
   a heat pipe having one end proximate said optical concentrator for being heated by said concentrating rays from the sun and an opposite end distal from said optical concentrator in contact with the working fluid for heating the working fluid,
   a gas turbine upon which said working fluid under pressure is directed for driving an electric generator, and
   a pump operatively connected to said gas turbine for returning the working fluid from said conduit to said housing,
   wherein said working fluid comprises a plurality of constituents, and further comprising means disposed between said gas turbine and said pump for separating one of said constituents from said working fluid and returning said separated one of said constituents to said housing, bypassing said pump, the remainder of said working fluid entering said pump,
   whereby a voltage is induced across said electrodes.

4. Apparatus according to claim 3 wherein said one of said constituents comprises cesium.

5. Apparatus according to claim 3 wherein said means for separating cools said working fluid.

6. Apparatus according to claim 3 wherein said pump comprises a Roots blower.

* * * * *